(12) United States Patent
Guilin

(10) Patent No.: US 8,397,996 B2
(45) Date of Patent: Mar. 19, 2013

(54) PORTABLE DATA CARRIER AND METHOD FOR THE PRODUCTION OF THE DATA CARRIER

(75) Inventor: Sun Guilin, HuangShi (CN)

(73) Assignee: Giesecke & Devrient GmbH, Munich (DE)

( * ) Notice: Subject to any disclaimer, the term of this patent is extended or adjusted under 35 U.S.C. 154(b) by 154 days.

(21) Appl. No.: 13/000,172

(22) PCT Filed: Jul. 1, 2009

(86) PCT No.: PCT/EP2009/004754
§ 371 (c)(1), (2), (4) Date: Dec. 20, 2010

(87) PCT Pub. No.: WO2010/000462
PCT Pub. Date: Jan. 7, 2010

(65) Prior Publication Data
US 2011/0101106 A1 May 5, 2011

(30) Foreign Application Priority Data
Jul. 2, 2008 (CN) .................. 2008 2 0068215 U

(51) Int. Cl.
G06K 19/02 (2006.01)

(52) U.S. Cl. ...................................... 235/488; 235/380
(58) Field of Classification Search .................. 235/488, 235/380, 492, 451, 375
See application file for complete search history.

(56) References Cited

U.S. PATENT DOCUMENTS

| | | | | |
|---|---|---|---|---|
| 5,498,305 | A | * | 3/1996 | Mailloux ...................... 156/249 |
| 2006/0011731 | A1 | * | 1/2006 | Anders et al. ................. 235/492 |
| 2007/0257797 | A1 | | 11/2007 | Rancien et al. |
| 2008/0106002 | A1 | | 5/2008 | Feldman et al. |

FOREIGN PATENT DOCUMENTS

| | | |
|---|---|---|
| DE | 198 51 836 A1 | 3/2000 |
| FR | 2 825 744 A | 12/2002 |

OTHER PUBLICATIONS

International Search Report in PCT/EP2009/004754, Sep. 17, 2009.

\* cited by examiner

Primary Examiner — Edwyn Labaze
(74) Attorney, Agent, or Firm — Bacon & Thomas, PLLC

(57) ABSTRACT

A portable data carrier with a card body (5) in which there are incorporated a chip module (7) and an antenna (7) for near-field communication, and a method for producing the data carrier. The data carrier has an improved mechanical stability.

13 Claims, 3 Drawing Sheets

PORTABLE DATA CARRIER AND METHOD FOR THE PRODUCTION OF THE DATA CARRIER

FIELD

This invention relates to a portable data carrier having a card body in which there are incorporated a chip module and an antenna for near-field communication, and to a method for producing the data carrier. The data carrier, which is for example a Crystal Card, is characterized by a high mechanical stability with high-gloss surfaces.

BACKGROUND

Portable data carriers are available on the market in different designs, recently also as bank cards or mass transit tickets, for example for so-called E-ticketing. An example of such data carriers is so-called Crystal Cards, in which the external form no longer corresponds to that of a classical rectangular credit/debit card. All these cards are multifunctional cards on which functions such as electronic payment are implemented. For this purpose, the cards are equipped with a chip module and an antenna to be able to communicate with an end device by a near-field communication. A near-field communication is for example a communication by the ISO/IEC 14443 standard protocol.

A Crystal Card is therefore a portable data carrier with which such transactions can be performed. The Crystal Card is unlimited in its external form, very compact, very easy to transport, and accepted by potential customers with rising popularity on account of its unrestricted external color design, surface design and shape design. Examples of such a Crystal Card are key pendants and digital coin carriers. The card form is unlimited.

For the individual color design, the card bodies of such portable data carriers are pasted with a printing ink layer on a polyvinyl chloride, or PVC, layer or as a kind of sticker. Alternatively, a printed plastic carrier paper is pasted as a printing ink layer on the card body. Subsequently, a clear glassy, transparent plastic layer, preferably an epoxy resin, is cast over the card body and the printing ink layer to protect the interior of the data carrier from external influences. The adhesive forces of such adhesives between card body and printing ink layer or between printing ink layer and plastic layer are so weak, however, that a delamination sets in between card body and printing ink layer or between printing ink layer and plastic layer, especially with plastic layers greater than 0.5 mm. As a result, the protective plastic layer falls off and the card body is unprotected from this time on.

Hence, it is an object of the present invention to show, or produce, a portable data carrier in which a sufficient protection of the card body is given.

BRIEF SUMMARY OF THE DISCLOSURE

This object is achieved with the measures described in the independently equal-ranking claims. Advantageous embodiments of the invention are shown in the respective dependent claims.

For achieving the object, a new structure of a portable data carrier is proposed. The portable data carrier has a card body. In the card body there is incorporated a chip module with an antenna for near-field communication. A printing ink layer is applied to a surface of the card body. Applied to the printing ink layer is a gloss varnish layer. Applied to the gloss varnish layer is a plastic layer, the plastic layer being transparent, in other words glass-clear, and having a layer thickness greater than 0.5 mm. Additionally, the data carrier has a through bore at a place outside the area of the antenna or the chip module. The through bore is employed for carrying the data carrier, for example by means of a carrying cord.

Through the gloss varnish, also designated gloss oil or just varnish in English, as a kind of binding agent there arise, after the manufacture of the data carrier, adhesive forces which hold together the thick plastic layer and the printing ink layer such that no delamination takes place any more. The data carrier is thus many times more stable than with the adhesives from the prior art. As an example of such a gloss varnish there is stated the type S4679 or S4767 from the British Apollo Company. The gloss varnish layer preferably has high gloss after drying, so that a glittery or glossy effect arises on the surface of the portable data carrier.

Alternatively, the above-described layer structure is applied to the card body on one side or on both sides. Through this structure there is achieved a two-sided color design of the portable data carrier.

In an advantageous embodiment, there is incorporated between the surface of the card body and the printing ink layer a base gloss varnish layer. Through this structure it is achieved that the gloss varnish is used as a kind of binding agent both for the thick plastic layer and the printing ink layer, thereby obtaining an increase in the adhesive forces between the card body and the printing ink layer.

Preferably, the printing ink layer is an offset printed layer or a screen printed layer, so that a coating of the card body is effected cost-efficiently, fast and with a high resolution.

In a preferred embodiment, the card body is of multilayer structure. Such a structure is for example the sandwich structure. In a card antenna layer there is inserted the antenna for near-field communication. By the sandwich method the card antenna layer is enclosed by two card base layers. The material of the card body is preferable white or colored to make possible an individual color design. The material of the multilayer card body is preferably polyvinyl chloride, or PVC, polyethylene terephthalate, or PET, and/or acrylonitrile-butadiene-styrene, or ABS.

Through the multilayer buildup and the subsequent influence of heat during further processing, that is, the lamination of the layer structure or the heating of the data carrier for curing the plastic layer, the card body becomes monolithic, so that a high degree of stability is achieved at minimum production costs.

Preferably, the plastic layer is an epoxy resin solution which, after curing, constitutes an optimal protection as well as a transparent, or "crystal", surface for the data carrier.

The idea of the invention further comprises a method for producing a portable data carrier. The data carrier has a card body with incorporated antenna and chip module for near-field communication. First, a surface of the card body is coated with a printing ink. Subsequently, the printing ink is coated with a gloss varnish. Thereafter, the card body is laminated with the printing ink layer and the gloss varnish. Lamination refers here to the heating and pressing of the data carrier, so that the layer structure of the data carrier is interconnected. After that, the gloss varnish is coated with a plastic layer, the plastic layer being thicker than 0.5 mm. By means of an oven the portable data carrier is heated, so that the plastic layer cures. After curing, the plastic layer is glass-clear, in other words transparent.

Alternatively, the card body is a multilayer PVC material. Said multilayer card body becomes monolithic through the actions of heat during lamination or heating in the oven, and therefore has a high stability at the same time as simplified production.

Alternatively, before the coating of the surface of the card body with printing ink there is carried out a coating by means of a base gloss varnish. This causes the adhesive forces between card body and printing ink layer to be very great at the end of the production process, so that a delamination cannot take place.

Alternatively, the obtained layer structure is fixed roughly on the card body by means of a spot welding before lamination. The fixation can also be effected alternatively.

Alternatively, the chip module is incorporated in the card body only before the fixing, in order to protect the chip module from the coating by means of gloss varnish and printing ink.

Preferably, production is effected in a multiplicity of portable data carriers, whereby the individual card bodies are all manufactured from a single workpiece and singled by means of punching only after the lamination. For this purpose, an individual PVC band as the base card body is processed, coated and treated according to the described method, and the individual card bodies are punched out only after the lamination of the individual layers on the PVC band. Preferably, a post-processing is effected subsequent to the separation of the card bodies from the PVC band. The post-processing is for example a fine blanking or a different way of shaping the data carrier so that the desired final shape is obtained.

Finally, there is effected the formation of a hole in the data carrier at a place outside the antenna or the chip module.

DESCRIPTION OF THE DRAWINGS

Hereinafter the invention will be explained more closely by way of example with reference to figures, whereby the figures merely describe embodiment examples of the invention. The same components in the figures are provided with the same reference signs. The figures are not to be considered true to scale; individual elements of the figures can be shown with an exaggerated size or exaggerated simplicity.

There are shown.

DETAILED DESCRIPTION OF PREFERRED EMBODIMENTS OF THE INVENTION

Figure 1:
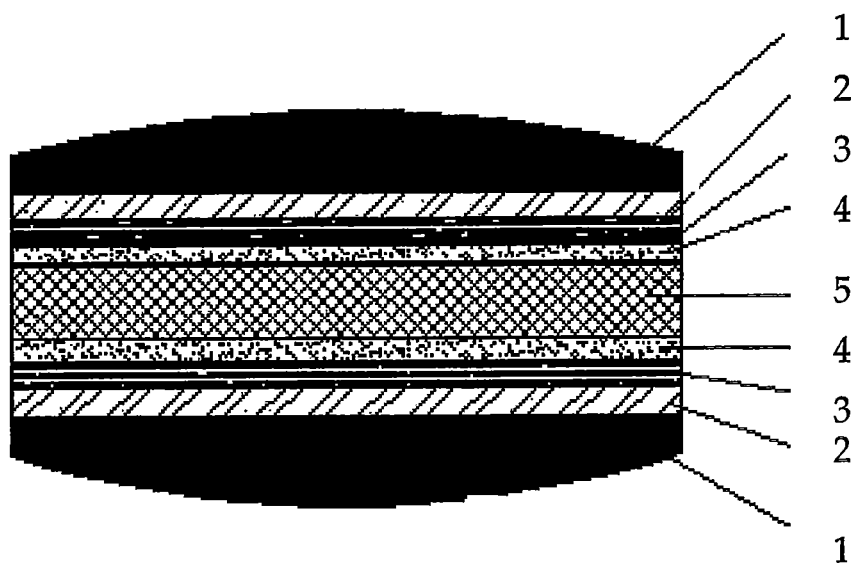
FIG. 1 a cross section of a portable data carrier according to the invention.

In FIG. 1 there is depicted a cross section of a portable data carrier according to the invention as is provided for example in the case of Crystal Cards. In the interior of the data carrier there is depicted a card body 5. In this, here single-layer, card body 5 there are incorporated an antenna 8 and a chip module 7 (not depicted). The incorporation can be an embedding or a printing of the antenna 8 on the card body. The antenna 8 and the chip module 7 are configured to exchange data and information with an end device by near-field communication.

On both surfaces of the card body 5 there is applied a base gloss varnish 4. The base gloss varnish is a kind of binding agent in this embodiment. Said gloss varnish builds up very good adhesive forces between the card body 5 and the overlying printing ink layer 3. This very effectively prevents a delamination of the printing ink layer 3 and the card body 5. The gloss varnish employed in this embodiment is the S2871 binding agent from the British Apollo company. It is preferably to be employed for PVC card bodies, for example A1.1 PVC, B1.1 PVC and B9.22 PVC, but is alternatively also usable for PET and ABS card bodies. The gloss varnish dries relatively fast and furthermore protects the card body 5.

The printing ink layer 3 is applied to the card body 5 either by an offset printing process or by a screen printing process. When the printing ink layer 3 is slightly dried, a gloss varnish 2 is applied above the printing ink layer 3. Said gloss varnish is, in this embodiment, the type S4767 or S4679 from the Apollo company. Both types of gloss varnish are characterized by the buildup of high adhesive forces after the completion of the data carrier. Further, the gloss varnishes have high gloss, i.e. they have a high degree of smoothness. This gives rise to additional color gloss effects.

Above the gloss varnish layer 2 there is applied a thick plastic layer 1, preferably an epoxy resin with a thickness greater than 0.5 mm. The epoxy resin is for example bisphenol A epoxy resin. In the literature the plastic layer 1 is designated a crystal plastic layer 1 in connection Crystal Cards.

Through the use of an epoxy resin as the plastic layer 1, the shape design of the data carrier is freely designable, so that for example curvatures of the surface and roundings on the side edges are possible, as depicted in FIG. 1.

Figure 2:
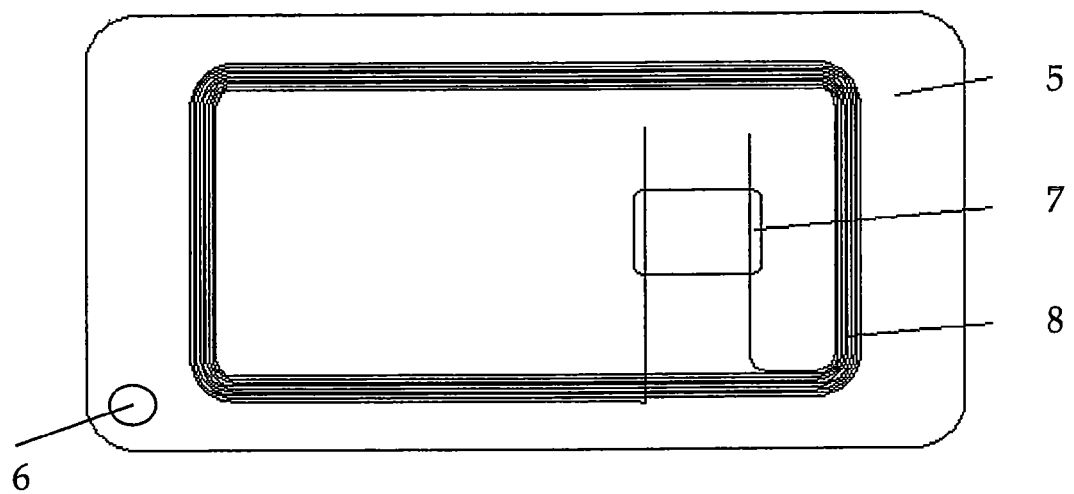
FIG. 2 a plan view of a card body antenna layer of a data carrier according to FIG. 1, FIG. 3 an alternative embodiment of a data carrier depicted in FIG. 1

In FIG. 2 there is depicted a plan view of a card body 5. Here, a chip module 7 is incorporated in the card body 5 and connected electroconductively to an antenna 8. The antenna 8 is incorporated on the card body by means of a printing method or alternatively incorporated by the sandwich method. The antenna 8 and the chip module 7 are configured for near-field communication by ISO/IEC 14443. Further, a hole 6 is formed in the card body 5. Said hole 6 goes through all layers of the data carrier and is formed at a place in the data carrier outside the area of the antenna 8 or the chip module 7. This ensures the functioning of antenna 8 and chip module 7. The hole 6 is used for fastening a transport device, for example a transport band, elastic band or the like, to the data carrier so that the data carrier can be transported easily and safely in everyday life, for example in the form of a key pendant, wearing around the neck, chain or a kind of digital coin.

Figure 3:
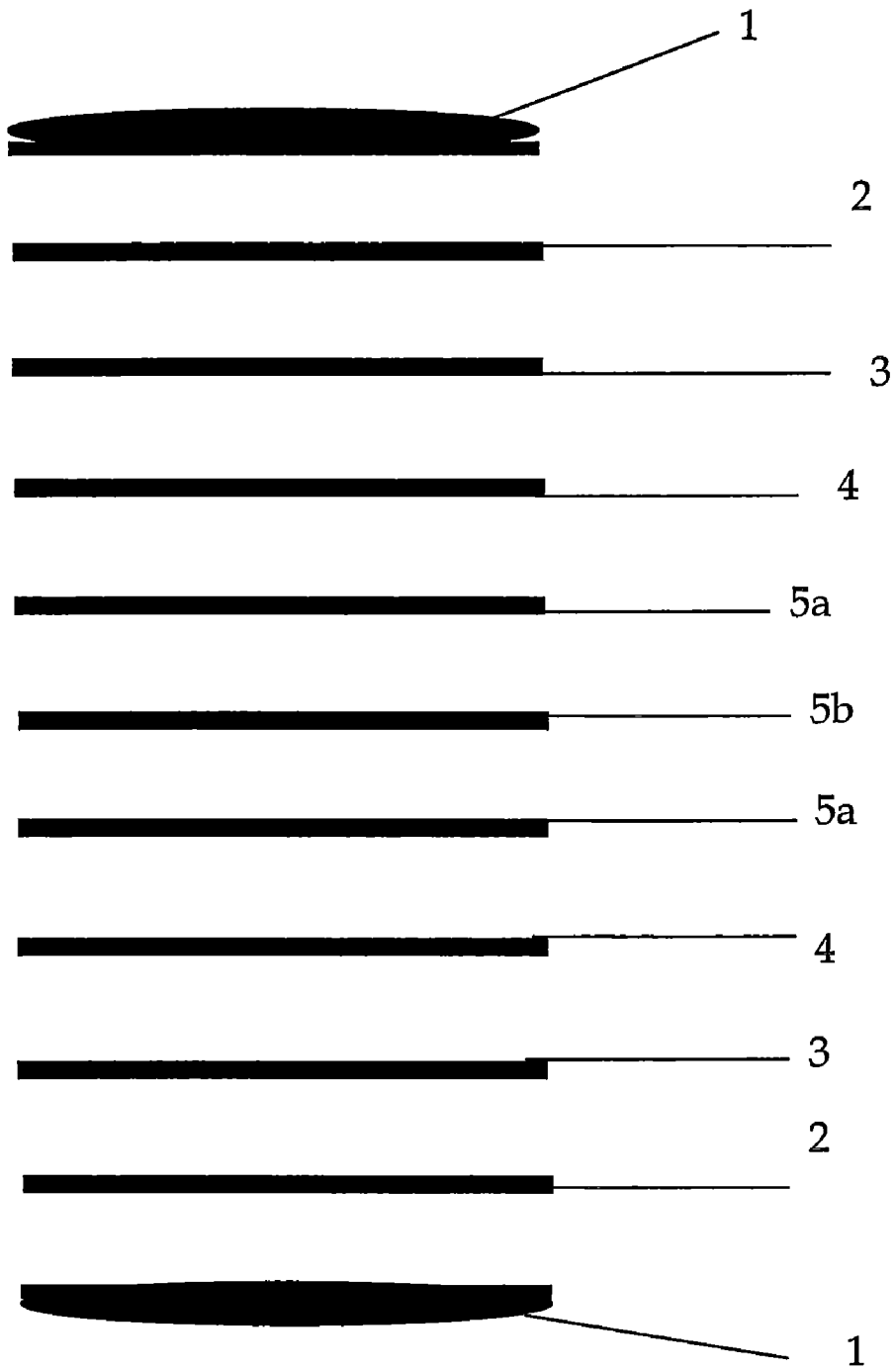

In FIG. 3 there is shown an alternative embodiment of the data carrier depicted in FIG. 1. The structure of the data carrier from FIG. 3 strongly resembles the data carrier from FIG. 1, so that hereinafter only the differences between the two figures will be dealt with. As opposed to FIG. 1, the data carrier of FIG. 3 has a multilayer card body 5. Said multilayer card body is also designated a sandwich structure. Here, a card body antenna layer 5b is incorporated in two card body base layers 5a. Because both layers 5a and 5b consist of a PVC, PET or ABS material, they become monolithic under the action of heat, i.e. the sublayers 5a, 5b of the card are fused into the card body 5. The advantage of the multilayer structure is the more cost-efficient incorporation of antenna 8 and chip module 7 and increase of stability of the data carrier.

Figure 4:
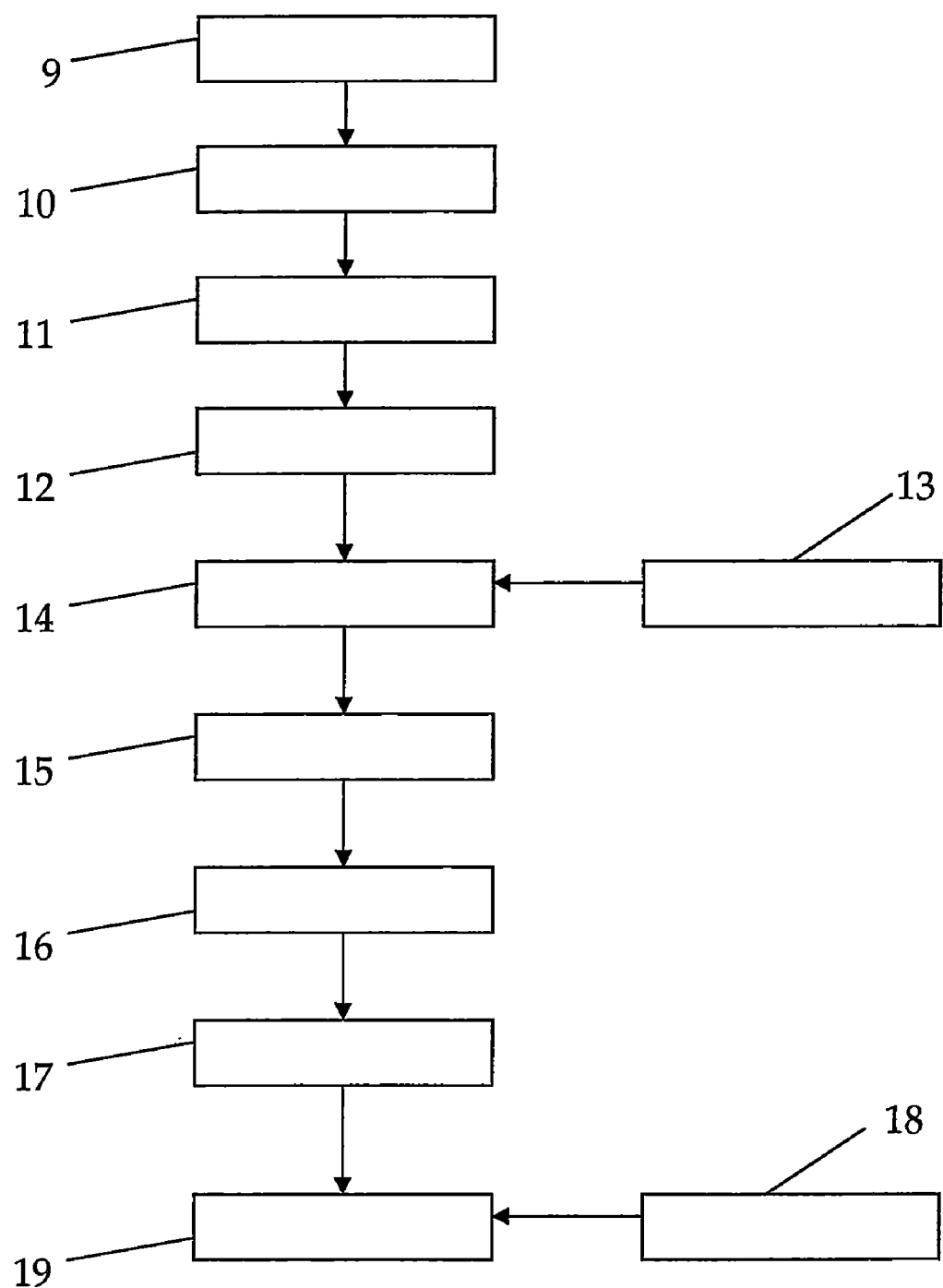
FIG. 4 a method flowchart of a method according to the invention

In FIG. 4 there is shown a method flowchart of the method according to the invention. In Table 1 there is stated detailed information with regard to optimized parameters for individual method steps. First, the production of the card body is effected 9. For this purpose, there is preferably employed A1.1 PVC, B1.1 PVC, B9.22 PVC. In the card body the antenna 8 is incorporated. Thereafter, a printing ink layer is applied by screen printing. For the screen print there is applied a fine-meshed screen-printing netting to the card body 5 on both sides. Subsequently, there is effected in step 11 the application of the printing ink on both sides by screen printing technology or offset printing. Because both methods are known, details of the printing methods will not be dealt with more closely here. Between steps 9 and 10 it is conceivable that a gloss varnish of the type S2871 from the Apollo company is incorporated in order to bind the printing ink layer to the card body with stronger adhesion. When the printing ink layer is slightly dried, the gloss varnish of the type S4767 or type 4679 is applied on both sides by screen printing technology in method step 12. In step 13 the chip module 7 is incorporated in the card body. Alternatively, the chip module 7 is already integrated in the card body 5 before method step 10 is applied.

Subsequently, there is effected in method step 14 a rough fixation of the layer structure by means of spot welding. Alternative fixation is likewise conceivable. For simplifying the method, the fixation might be omitted. The advantage of fixation consists in that a position change of the layers is no longer possible. After that, there is laminated in method step 15 printing ink layer 3, base gloss varnish layer 4, gloss varnish layer 2 and card body 5. Lamination refers here to the heating and pressing of the data carrier with the parameters employed by way of example in Table 1. In the subsequent step 16 the half-finished data carriers, which are preferably produced in a multiplicity, are singled by ID-1 die-cutting. Specifically, this means that by means of a punching method the individual data carriers are punched out of a one-pieced workpiece, for example a thin PVC band. Subsequently, by a so-called allotypic die-cutting method 17 the individual laminated half-finished data carriers are post-processed. Post-processing refers for example to a fine blanking or fine cutting to size. Subsequently, in step 18 the epoxy resin is prepared for the plastic layer to be applied. Essentially, this refers to the heating of the epoxy resin which forms the plastic layer. As the type, bisphenol of type A or B is proposed here. The plastic layer will preferably have a thickness of more than 0.5 mm.

The heated epoxy resin is applied to the half-finished data carrier. Subsequently, the data carrier is heated in an oven, so that the epoxy resin cures. After curing, the plastic layer is transparent, i.e. glass-clear. If the card body 5 is multilayered, it becomes a monolithic card body 5 in the oven through fusion of the individual layers 5a and 5b.

In the following Table 1 there are stated by way of example devices and optimized parameters for important substeps of the method.

LIST OF REFERENCE SIGNS

| | |
|---|---|
| 1 | Plastic layer, epoxy resin, thickness greater than 0.5 mm |
| 2 | Binding agent layer, gloss varnish (S4679, S4767) |
| 3 | Printing ink layer |
| 4 | Base binding agent layer, gloss varnish (S2871) |
| 5 | Card body |
| 5a | Card body base layer, PVC |
| 5b | Card body antenna layer, PVC |
| 6 | Through bore, hole |
| 7 | Chip module |
| 8 | Antenna for near-field communication |
| 9 | Production of card body |
| 10 | Application of screen-printing netting on card body (on both sides) |
| 11 | Application of printing ink by screen printing technology (on both sides) |
| 12 | Coating with gloss varnish by screen printing technology (on both sides) |
| 13 | Incorporation of chip module |
| 14 | Spot welding |
| 15 | Lamination |
| 16 | Rough cutting to size |
| 17 | Fine cutting to size |
| 18 | Preparation of plastic for plastic layer |
| 19 | Application of prepared plastic (on both sides) |

What is claimed:

1. A portable data carrier, comprising:
a card body having at least one surface;
a chip module having an antenna for near-field communication which is incorporated in the card body;
a base gloss varnish layer applied on the at least one surface of the card body;
a printing ink layer on the at least one surface of the card body;
a gloss varnish layer on the printing ink layer;
a plastic layer on the gloss varnish layer, the plastic layer being transparent and having a layer thickness greater than 0.5 mm; and
a through bore in the data carrier at a place outside the area of the antenna or the chip module, said through bore being employable for carrying the data carrier.

2. The portable data carrier according to claim 1, wherein the printing ink layer is provided on the card body on one side or on both sides.

3. The portable data carrier according to claim 1, wherein the printing ink layer is an offset printed layer or a screen printed layer.

TABLE 1

| No. | Device name | Method | Optimal parameters |
|---|---|---|---|
| 11 | RP74 | Application of printing ink | Print speed: 4000 sheets an hour<br>Drying energy 120 W/cm |
| 11, 12 | WFT1020A | Application of gloss varnish or color print by screen printing process | Print speed: 1000 sheets an hour<br>Drying temperature: 38-42° C. |
| 15 | CHK 120/240 | Lamination | Temperature: 130-150° C., Pressure 50-90 bars |
| 16 | LOUDA | Rough cutting to size | |
| 17 | SIM-PM | Fine cutting to size | |
| 19 | Oven | Application of plastic layer | Temperature: 45-50, Time for curing: 4 hours |

4. The portable data carrier according to claim 1, wherein the card body:
   is multilayer,
   the material of the card body is white or colored, and
   the material comprises PVC, PET or ABS.

5. The portable data carrier according to claim 1, wherein the plastic layer is an epoxy resin.

6. The portable data carrier according to claim 1, wherein the base gloss varnish layer and the gloss varnish layer are configured to prevent delamination by having very good adhesive forces between the printing ink layer and the card body.

7. A method for producing a portable data carrier, wherein the data carrier comprises a card body with an incorporated antenna and a chip module for near-field communication, comprising the steps:
   coating a surface of the card body with a gloss varnish-like base gloss varnish;
   coating the surface of the card body with a printing ink;
   coating the printing ink with a gloss varnish layer;
   laminating the card body with the printing ink layer and the gloss varnish layer;
   coating the gloss varnish layer with a plastic layer, wherein the plastic layer is thicker than 0.5 mm; and
   heating the portable data carrier to cure the plastic layer, wherein the plastic layer is transparent after curing.

8. The method according to claim 7, wherein the card body is a multilayer PVC material and said PVC material becomes monolithic under the action of heat during the heating steps.

9. The method according to claim 7, wherein a hole is provided in the data carrier at a place outside the area of the antenna or the chip module.

10. The method according to claim 7, wherein the data carrier is fixed by means of spot welding before lamination.

11. The method according to claim 7, wherein the base gloss varnish layer and the gloss varnish layer are configured to prevent delamination by having very good adhesive forces between the printing ink layer and the card body.

12. A method for producing a multiplicity of portable data carriers according to the method of claim 7, wherein the individual card bodies are all manufactured from a single workpiece and are singled by means of punching only after lamination.

13. The method according to claim 12, wherein the final shape of the data carrier is achieved by means of fine blanking after singling.

* * * * *